United States Patent
Quinn (10) Patent No.: US 10,501,880 B2
(45) Date of Patent: Dec. 10, 2019

(54) LAUNDRY TREATING APPLIANCE AND METHOD OF OPERATION

(71) Applicant: WHIRLPOOL CORPORATION, Benton Harbor, MI (US)

(72) Inventor: Daniel E. Quinn, Fall River, MA (US)

(73) Assignee: Whirlpool Corporation, Benton Harbor, MI (US)

( * ) Notice: Subject to any disclaimer, the term of this patent is extended or adjusted under 35 U.S.C. 154(b) by 210 days.

(21) Appl. No.: 15/606,188

(22) Filed: May 26, 2017

(65) Prior Publication Data
US 2018/0340284 A1 Nov. 29, 2018

(51) Int. Cl.
*D06F 33/02* (2006.01)
*D06F 39/00* (2006.01)
*D06F 35/00* (2006.01)
*G05B 19/04* (2006.01)

(52) U.S. Cl.
CPC ............ *D06F 33/02* (2013.01); *D06F 35/007* (2013.01); *D06F 39/003* (2013.01); *G05B 19/0415* (2013.01); *D06F 39/002* (2013.01); *D06F 2202/02* (2013.01); *D06F 2202/06* (2013.01); *D06F 2202/10* (2013.01); *D06F 2202/12* (2013.01); *D06F 2204/065* (2013.01); *D06F 2204/088* (2013.01); *D06F 2222/00* (2013.01)

(58) Field of Classification Search
CPC .......... D06F 33/02; D06F 23/02; D06F 25/00; D06F 35/007; D06F 39/002; D06F 39/003; D06F 2232/08; D06F 2232/10
See application file for complete search history.

(56) References Cited

U.S. PATENT DOCUMENTS

| | | | |
|---|---|---|---|
| 4,782,544 A | 11/1988 | Nystuen et al. | |
| 9,115,455 B2 | 8/2015 | Polli et al. | |
| 2011/0061177 A1* | 3/2011 | Kappler | D06F 33/02 8/137 |
| 2012/0096737 A1* | 4/2012 | Kmet | D06F 39/003 34/443 |
| 2013/0160219 A1* | 6/2013 | Ashrafzadeh | D06F 33/02 8/137 |
| 2013/0276324 A1* | 10/2013 | Carow | F26B 21/00 34/282 |
| 2014/0259447 A1* | 9/2014 | Alexander | D06F 39/004 8/137 |
| 2014/0326067 A1* | 11/2014 | Chanda | G01N 9/00 73/32 R |
| 2017/0145614 A1* | 5/2017 | Janke | D06F 37/203 |

FOREIGN PATENT DOCUMENTS

| | | |
|---|---|---|
| EP | 2977502 A1 | 1/2016 |
| KR | 100840543 B1 | 6/2008 |

* cited by examiner

*Primary Examiner* — Joseph L. Perrin
(74) *Attorney, Agent, or Firm* — McGarry Bair PC (57) ABSTRACT

A laundry treating appliance and method of operating a laundry treating appliance that includes wetting the laundry load in a drum according to a selected cycle of operation. A controller associated with the laundry treating appliance may be configured to determine a remaining moisture content of the laundry and a time remaining in the selected cycle of operation based on the remaining moisture content.

20 Claims, 7 Drawing Sheets

LAUNDRY TREATING APPLIANCE AND METHOD OF OPERATION

BACKGROUND

Laundry treating appliances, such as clothes washers, clothes dryers, refreshers, and non-aqueous systems, may have a configuration based on a rotating drum that defines a treating chamber in which laundry items are placed for treating according to one or more cycles of operation. One or more of the cycles of operation may include rotating the drum at high speeds during a spin or water extraction phase to extract liquid from the laundry items. If a sufficiently large enough load imbalance is present, the laundry treating appliance may experience undesirable vibrations and movements when the drum is rotated at high speeds during the spin phase. If the drum rotation speed during the spin phase is too low, the spin phase may take too long to complete or the desired amount of liquid may not be extracted.

BRIEF SUMMARY

In one aspect the present disclosure relates to a laundry treating appliance and method of operating a laundry treating appliance that includes a laundry treating appliance having a drum at least partially defining a treating chamber and rotatable about an axis of rotation, a motor configured to rotate the drum, a liquid supply system, and a controller configured to implement the cycle of operation. The controller can receive input regarding a selected final moisture content of the laundry. The laundry load may be wet according to a selected cycle of operation and the drum may be rotated at an extraction speed to extract at least a portion of the liquid wetting the laundry load. The controller may be configured to determine a remaining moisture content of the laundry and a time remaining in the selected cycle of operation based on the remaining moisture content.

DESCRIPTION

Figure 1:
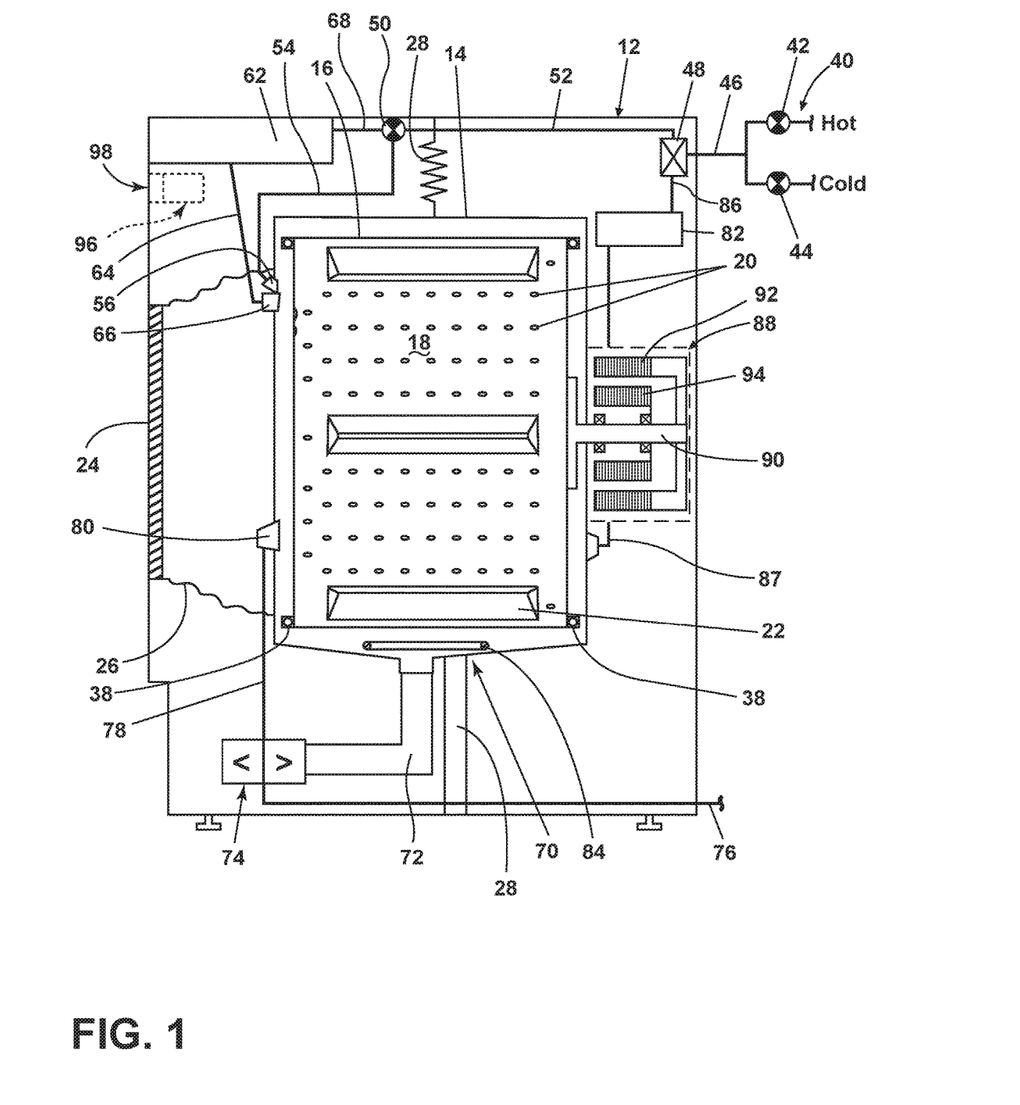
FIG. 1 is a schematic view of a laundry treating appliance in the form of a washing machine.

FIG. 1 is a schematic view of a laundry treating appliance according to an aspect of the present disclosure. The laundry treating appliance may be any appliance which performs an automatic cycle of operation to clean or otherwise treat items placed in a container therein, non-limiting examples of which include a horizontal or vertical axis clothes washer or washing machine; a combination washing machine and dryer; a dispensing dryer; a tumbling or stationary refreshing/revitalizing machine; an extractor; a non-aqueous washing apparatus; and a revitalizing machine. The laundry treating appliance may be a household appliance or a commercial appliance.

As used herein, the term "vertical-axis" washing machine refers to a washing machine having a rotatable drum that rotates about a generally vertical axis relative to a surface that supports the washing machine. However, the rotational axis need not be perfectly vertical to the surface. The drum may rotate about an axis inclined relative to the vertical axis, with fifteen degrees of inclination being one example of the inclination. Similar to the vertical axis washing machine, the term "horizontal-axis" washing machine refers to a washing machine having a rotatable drum that rotates about a generally horizontal axis relative to a surface that supports the washing machine. The drum may rotate about the axis inclined relative to the horizontal axis, with fifteen degrees of inclination being one example of the inclination.

The laundry treating appliance of FIG. 1 is illustrated as a horizontal-axis washing machine 10, which may include a structural support system including a cabinet 12 which defines a housing within which a laundry holding system resides. The cabinet 12 may be a housing having a chassis and/or a frame, defining an interior enclosing components typically found in a conventional washing machine, such as motors, pumps, fluid lines, controls, sensors, transducers, and the like. Such components will not be described further herein except as necessary for a complete understanding of the invention.

The laundry holding system includes a tub 14 supported within the cabinet 12 by a suitable suspension system and a drum 16 provided within the tub 14, the drum 16 defining at least a portion of a laundry treating chamber 18 for receiving a laundry load for treatment. The drum 16 may include a plurality of perforations 20 such that liquid may flow between the tub 14 and the drum 16 through the perforations 20. A plurality of baffles 22 may be disposed on an inner surface of the drum 16 to lift the laundry load received in the treating chamber 18 while the drum 16 rotates. It may also be within the scope of the present disclosure for the laundry holding system to include only a tub with the tub defining the laundry treating chamber.

The laundry holding system may further include a door 24 which may be movably mounted to the cabinet 12 to selectively close both the tub 14 and the drum 16. A bellows 26 may couple an open face of the tub 14 with the cabinet 12, with the door 24 sealing against the bellows 26 when the door 24 closes the tub 14. The washing machine 10 may further include a suspension system 28 for dynamically suspending the laundry holding system within the structural support system.

The washing machine 10 may optionally include at least one balance ring 38 containing a balancing material moveable within the balance ring 38 to counterbalance an imbalance that may be caused by laundry in the treating chamber 18 during rotation of the drum 16. More specifically, the balance ring 38 may be coupled with the rotating drum 16 and configured to compensate for a dynamic imbalance during rotation of the rotatable drum 16. The balancing material may be in the form of balls, fluid, or a combination thereof. The balance ring 38 may extend circumferentially around a periphery of the drum 16 and may be located at any desired location along an axis of rotation of the drum 16. When multiple balance rings 38 are present, they may be equally spaced along the axis of rotation of the drum 16. For example, in the illustrated example a plurality of balance rings 38 are included in the washing machine 10 and the plurality of balance rings 38 are operably coupled with opposite ends of the rotatable drum 16.

The washing machine 10 may further include a liquid supply system for supplying water to the washing machine 10 for use in treating laundry during a cycle of operation. The liquid supply system may include a source of water, such as a household water supply 40, which may include separate valves 42 and 44 for controlling the flow of hot and cold water, respectively. Water may be supplied through an inlet conduit 46 directly to the tub 14 by controlling first and second diverter mechanisms 48 and 50, respectively. The diverter mechanisms 48, 50 may be a diverter valve having two outlets such that the diverter mechanisms 48, 50 may selectively direct a flow of liquid to one or both of two flow paths. Water from the household water supply 40 may flow through the inlet conduit 46 to the first diverter mechanism 48 which may direct the flow of liquid to a supply conduit 52. The second diverter mechanism 50 on the supply conduit 52 may direct the flow of liquid to a tub outlet conduit 54 which may be provided with a spray nozzle 56 configured to spray the flow of liquid into the tub 14. In this manner, water from the household water supply 40 may be supplied directly to the tub 14.

The washing machine 10 may also be provided with a dispensing system for dispensing treating chemistry to the treating chamber 18 for use in treating the laundry according to a cycle of operation. The dispensing system may include a dispenser 62 which may be a single use dispenser, a bulk dispenser or a combination of a single use and bulk dispenser.

Regardless of the type of dispenser used, the dispenser 62 may be configured to dispense a treating chemistry directly to the tub 14 or mixed with water from the liquid supply system through a dispensing outlet conduit 64. The dispensing outlet conduit 64 may include a dispensing nozzle 66 configured to dispense the treating chemistry into the tub 14 in a desired pattern and under a desired amount of pressure. For example, the dispensing nozzle 66 may be configured to dispense a flow or stream of treating chemistry into the tub 14 by gravity, i.e. a non-pressurized stream. Water may be supplied to the dispenser 62 from the supply conduit 52 by directing the diverter mechanism 50 to direct the flow of water to a dispensing supply conduit 68.

Non-limiting examples of treating chemistries that may be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

The washing machine 10 may also include a recirculation and drain system for recirculating liquid within the laundry holding system and draining liquid from the washing machine 10. Liquid supplied to the tub 14 through the tub outlet conduit 54 and/or the dispensing supply conduit 68 typically enters a space between the tub 14 and the drum 16 and may flow by gravity to a sump 70 formed in part by a lower portion of the tub 14. The sump 70 may also be formed by a sump conduit 72 that may fluidly couple the lower portion of the tub 14 to a pump 74. The pump 74 may direct liquid to a drain conduit 76, which may drain the liquid from the washing machine 10, or to a recirculation conduit 78, which may terminate at a recirculation inlet 80. The recirculation inlet 80 may direct the liquid from the recirculation conduit 78 into the drum 16. The recirculation inlet 80 may introduce the liquid into the drum 16 in any suitable manner, such as by spraying, dripping, or providing a steady flow of liquid. In this manner, liquid provided to the tub 14, with or without treating chemistry may be recirculated into the treating chamber 18 for treating the laundry within.

The liquid supply and/or recirculation and drain system may be provided with a heating system which may include one or more devices for heating laundry and/or liquid supplied to the tub 14, such as a steam generator 82 and/or a sump heater 84. Liquid from the household water supply 40 may be provided to the steam generator 82 through the inlet conduit 46 by controlling the first diverter mechanism 48 to direct the flow of liquid to a steam supply conduit 86. Steam generated by the steam generator 82 may be supplied to the tub 14 through a steam outlet conduit 87. The steam generator 82 may be any suitable type of steam generator such as a flow through steam generator or a tank-type steam generator. Alternatively, the sump heater 84 may be used to generate steam in place of or in addition to the steam generator 82. In addition or alternatively to generating steam, the steam generator 82 and/or sump heater 84 may be used to heat the laundry and/or liquid within the tub 14 as part of a cycle of operation.

Additionally, the liquid supply and recirculation and drain system may differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 also includes a drive system for rotating the drum 16 within the tub 14. The drive system may include a motor 88 for rotationally driving the drum 16. The motor 88 may be directly coupled with the drum 16 through a drive shaft 90 to rotate the drum 16 about a rotational axis during a cycle of operation. The motor 88 may be a brushless permanent magnet (BPM) motor having a stator 92 and a rotor 94. Alternately, the motor 88 may be coupled with the drum 16 through a belt and a drive shaft to rotate the drum 16, as is known in the art. Other motors, such as an induction motor or a permanent split capacitor (PSC) motor, may also be used. The motor 88 may rotationally drive the drum 16 including that the motor 88 may rotate the drum 16 at various speeds in either rotational direction.

The washing machine 10 also includes a control system for controlling the operation of the washing machine 10 to implement one or more cycles of operation. The control system may include a controller 96 located within the cabinet 12 and a user interface 98 that may be operably coupled with the controller 96. The user interface 98 may include one or more knobs, dials, switches, displays, touch screens and the like for communicating with the user, such as to receive input and provide output. The user may enter different types of information including, without limitation, cycle selection and cycle parameters, such as cycle options.

The controller 96 may include the machine controller and any additional controllers provided for controlling any of the components of the washing machine 10. For example, the controller 96 may include the machine controller and a motor controller. Many known types of controllers may be used for the controller 96. It is contemplated that the controller may be a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), may be used to control the various components.

Figure 2:
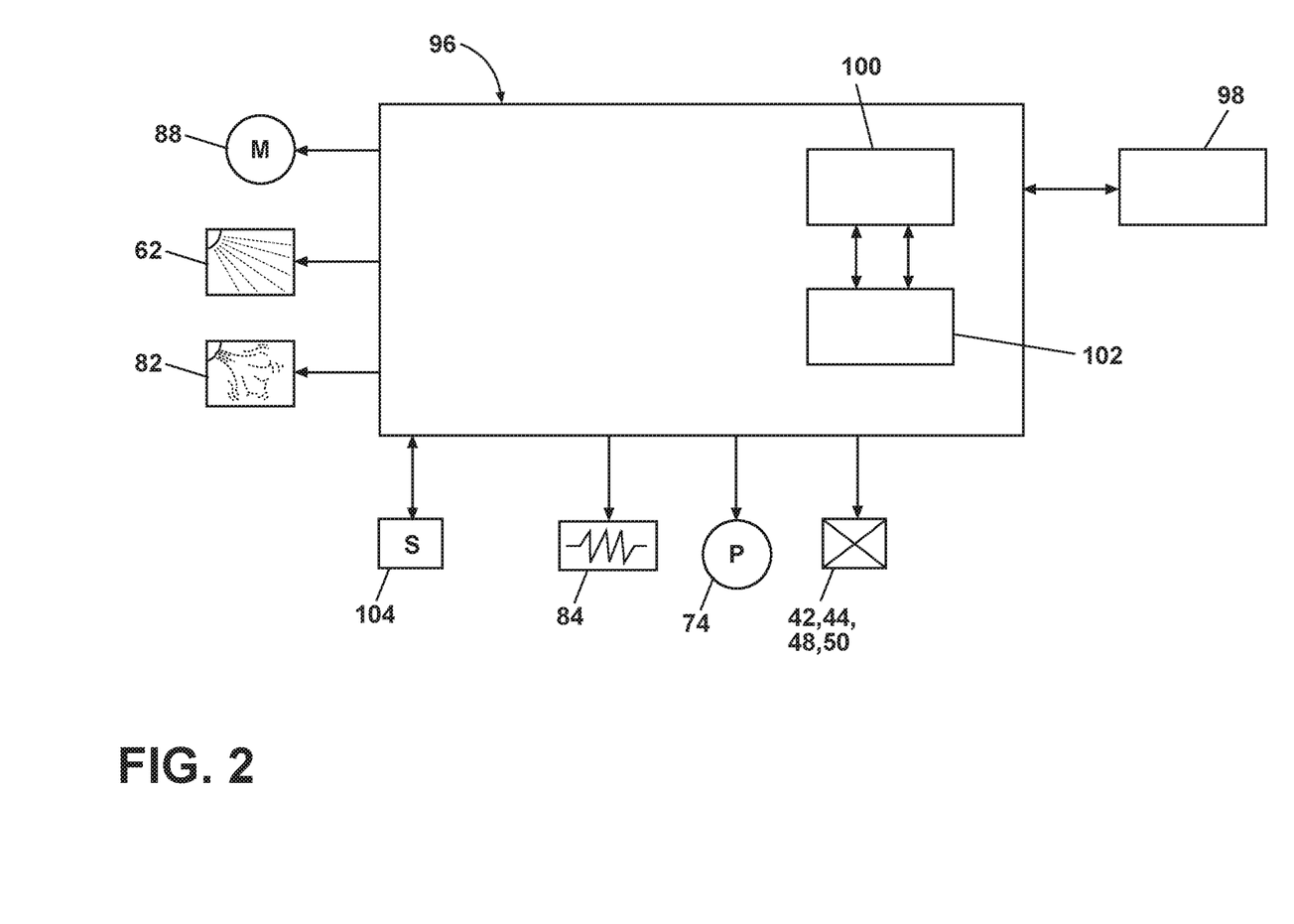
FIG. 2 is a schematic of a control system of the laundry treating appliance of FIG. 1 according to an aspect of the present disclosure.

As illustrated in FIG. 2, the controller 96 may be provided with a memory 100 and a central processing unit (CPU) 102. The memory 100 may be used for storing the control software that may be executed by the CPU 102 in completing a cycle of operation using the washing machine 10 and any additional software. Examples, without limitation, of cycles of operation include: wash, heavy duty wash, delicate wash, quick wash, pre-wash, refresh, rinse only, and timed wash. The memory 100 may also be used to store information, such as a database or table, and to store data received from one or more components of the washing machine 10 that may be communicably coupled with the controller 96. The database or table may be used to store the various operating parameters for the one or more cycles of operation, including factory default values for the operating parameters and any adjustments to them by the control system or by user input.

The controller 96 may be operably coupled with one or more components of the washing machine 10 for communicating with and controlling the operation of the component to complete a cycle of operation. For example, the controller 96 may be operably coupled with the motor 88, the pump 74, the dispenser 62, the steam generator 82, and the sump heater 84 to control the operation of these and other components to implement one or more of the cycles of operation.

The controller 96 may also be coupled with one or more sensors 104 provided in one or more of the systems of the washing machine 10 to receive input from the sensors, which are known in the art and not shown for simplicity. Non-limiting examples of sensors 104 that may be communicably coupled with the controller 96 include: a treating chamber temperature sensor, a moisture sensor, a weight sensor, a chemical sensor, a position sensor, an imbalance sensor, a load size sensor, and a motor torque sensor, which may be used to determine a variety of system and laundry characteristics, such as laundry load inertia, mass, and imbalance magnitude.

A typical cycle of operation generally includes multiple phases depending on the intended purpose of the cycle. For example, a conventional wash cycle of operation includes at least three phases: a wash phase, a rinse phase, and an extraction phase (also referred to as spin phase). These three wash cycle phases may be supplemented by additional phases, such as a pre-treatment or a stain removal phase, for example, based on the selected cycle of operation. Optionally, one or more of the phases may be repeated, such as the rinse phase. In general, during the wash phase, the laundry load is treated with a liquid that includes a treating chemistry to facilitate removing soil and stains from the laundry. During the rinse phase, water is supplied to the laundry load to remove residual treating chemistry and/or soil, as desired. The extraction phase includes rotating the laundry load at high speeds to extract liquid from the laundry load prior to the end of the cycle. Removal of liquid from the laundry load at the end of the wash cycle can decrease the amount of energy and/or time required to dry the laundry load after completion of the laundry load.

The washing machine 10 may extract liquid from the laundry items located within the treating chamber 18 forming the laundry load during a cycle of operation by rotating the drum 16 about the drum rotational axis such that inertia causes liquid to be extracted from the laundry items. Extraction rotation speeds, also referred to as spin speeds, are typically high in order to extract the desired amount of liquid from the laundry items in a short amount of time, thus saving time and energy. However, when the laundry items and liquid are not evenly distributed about the rotational axis of the drum 16 and/or unevenly distributed about the circumference of the drum, an imbalance condition may occur.

Typical spin speeds in a horizontal axis washer are about 800-2000 RPM and provide an inertial force of 1 G or greater, sometimes even up to and greater than 400 G, to the laundry items. At such high speeds, an imbalance can result in unacceptable vibratory movement of the tub 14, the drum 16, and even the entire washing machine 10. The washing machine 10 can be affected severely enough that it may exhibit a side-to-side movement, when viewed from the front/rear, which results in a "walking" across the floor and cause floor vibration. The tub 14 can move enough such that the tub 14 reaches the limit of its suspension and/or contacts the surrounding cabinet 12, referred to as "cabinet hits," with consequent noise and possible damage. In addition, the imbalance can also cause the drum 16 to move relative to the tub 14 to such an extent that the drum 16 contacts the surrounding tub 14, with consequent noise and possible damage.

As used herein, rotating the drum 16 at an extraction speed, referred to interchangeably as a spin speed, refers to rotating the drum 16 to apply an inertial force of greater than or equal to 1 G to at least some of the laundry items. Spin speeds are high rotation speeds that result in the laundry items being held by inertial force against the inner surface of the drum 16 as the drum 16 rotates, also sometimes referred to as a satellizing or plastering condition. For a horizontal axis washing machine 10, the drum 16 may rotate about an axis that may be inclined relative to the horizontal, in which case the term "1 G" refers to the vertical component of the inertial force vector, and the total magnitude along the inertial force vector would therefore be greater than 1 G. For a given drum diameter, the G force is directly proportional to a speed of rotation of the drum. Thus, it will be understood that while aspects of the present disclosure may be discussed in terms of G force, the drum rotation speed required to impart a given G force can be determined for each washing machine 10 based on the diameter of the drum 16 and vice versa.

As described herein, the term "imbalance" or "unbalance," when used alone or in combination with the words "condition," "mass," "phase," "magnitude," "position," or otherwise, refers to an object being in a state of unbalance relative to its respective reference frame, i.e., an object positioned in a washing machine so as to shift the center of gravity, or the orientation of the principal axis, of a rotating inertial mass away from the longitudinal axis of the rotating shaft in the washing machine.

Generally, an extraction phase involves rotating the drum 16 at a final spin or extraction speed for a predetermined period of time to extract at least a portion of the liquid carried by the laundry, after which the drum speed is decreased and the extraction phase is ended. The final spin speed is often a maximum allowable speed for rotating the drum 16 based on a predetermined set of conditions, such as the size of the laundry load and/or an amount of unbalance in the load, for example. The extraction phase can include multiple sections or sub-phases leading up to rotating the drum 16 at the maximum allowable spin speed to extract liquid from the laundry load. For example, the extraction phase can optionally include a tumbling section in which the drum 16 is alternately rotated clockwise and counterclockwise at slow speeds, less than a spin speed, to facilitate distribution of the laundry load. In another example, the extraction phase can include an imbalance magnitude detection section in which a magnitude of imbalance of the laundry load is determined before the laundry is rotated at a spin speed to extract liquid. The tumbling and imbalance magnitude detection sections may optionally be considered separate phases, independent of the extraction phase.

Figure 3:
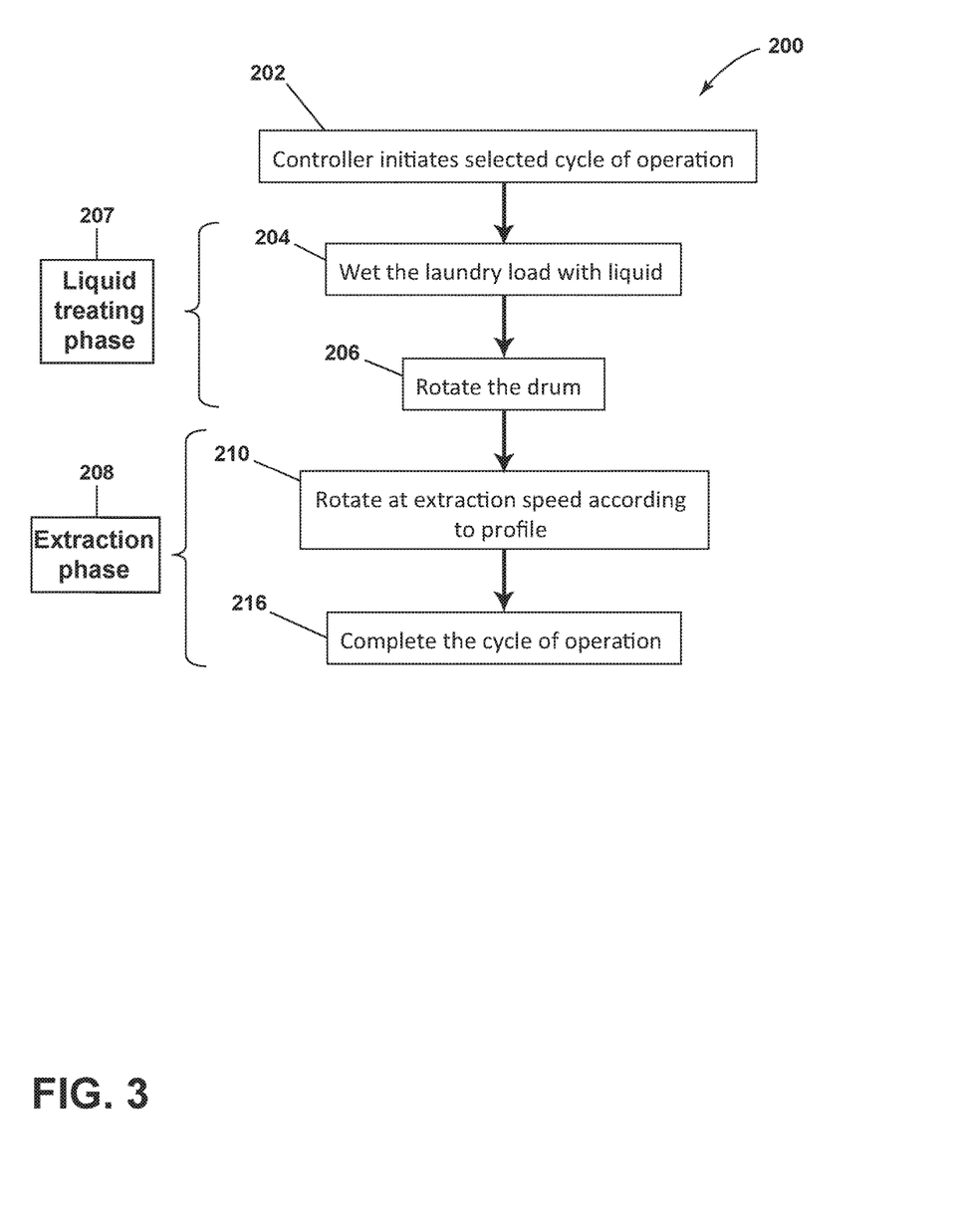
FIG. 3 is a flow chart illustrating a method of operating the laundry treating appliance according to an aspect of the present disclosure.

Referring now to FIG. 3, a flow chart of a method 200 for operating a laundry treating appliance, such as the washing machine 10, is illustrated. The sequence depicted for this method is for illustrative purposes only, and is not meant to limit the method in any way as it is understood that the steps may proceed in a different logical order or additional or intervening steps may be included without detracting from the present disclosure.

The method 200 begins assuming that a user has placed laundry items to be treated into the treating chamber 18 and selected a cycle of operation through the user interface 98. The method 200 may be used with any cycle of operation that includes wetting the laundry load with liquid, non-limiting examples of which include a wash cycle, a rinse cycle, and a treatment aid cycle. At 202, the controller 96 initiates the selected cycle of operation and controls the liquid supply system and the dispensing system to wet the laundry items with water and/or a treating chemistry according to the selected cycle of operation at 204. At 206, the drum 16 may be rotated according the selected cycle of operation to facilitate wetting the laundry items with water and/or a dispensed treating chemistry. The wetting of the laundry items and rotating the drum at 204 and 206 may be implemented one or more times based on the selected cycle of operation as part of a liquid treating phase 207. In one example, the wetting of the laundry items and rotating the drum at 204 and 206 occurs at least once as part of a pre-wash phase, a wash phase and/or a rinse phase of the selected cycle of operation. In another example, the wetting of the laundry items and rotating the drum at 204 and 206 occurs as part of a treatment aid phase in which the laundry items are treated with a treatment aid, non-limiting examples of which include a whitening agent, a stain removal agent, and an anti-wrinkle agent.

Following the liquid treating phase 207, an extraction phase 208 may be implemented to remove at least a portion of the liquid supplied during the liquid treating phase 207 and carried by the laundry load. As discussed above, the drum 16 may be rotated at high speeds to impart a G force sufficient to extract liquid from the laundry load. At 210 the drum may be rotated according to an extraction profile that includes at least one stage during which the drum is rotated apply an inertial force of greater than or equal to 1 G to at least some of the laundry items. The extraction profile may include rotating the drum 16 at a single extraction speed or multiple extraction speeds. The extraction speed or speeds may be determined according to any suitable method and may be based on any suitable criteria, non-limiting examples of which include, a magnitude of imbalance, a position of an imbalance, a type of laundry, an amount of laundry, and a selected cycle of operation. Drum speed may be expressed in terms of the number of rotations of the drum 16 (e.g. rotations per minute "RPM") or in terms of the G force imparted to the laundry during rotation of the drum 16.

The drum 16 can be rotated according to the spin profile at 210 until a predetermined time period for the extraction phase has elapsed and/or until a remaining moisture content (RMC) of the laundry satisfies a predetermined RMC threshold. As used herein, remaining moisture content (RMC) is defined as the ratio of an amount of water in the fabric in addition to the natural regain moisture of the fabric to the amount of fabric. The natural regain moisture of a fabric is based on the natural amount of moisture in the fabric at dry conditions and is considered zero water or zero RMC. According to an aspect of the disclosure, 100% RMC may be considered as double the dry weight of the laundry load.

At 216, the cycle of operation can be completed subsequent to completing the extraction phase. The cycle of operation can be completed by rotating the drum 16 at a speed less than an extraction speed, which can include actively braking the drum 16 and/or allowing the drum 16 to coast to a lower speed of rotation. Completion of the cycle of operation optionally includes treatment of the laundry with one or more treatment aids, non-limiting examples of which include fragrances, anti-wrinkle agents, anti-shrinkage agents, leave-in fabric softeners, and color protectors. Prior to ending the cycle of operation at 216, the liquid treating phase 207 and the extraction phase 208 can be repeated one or more times based on the selected cycle of operation.

Figure 4:
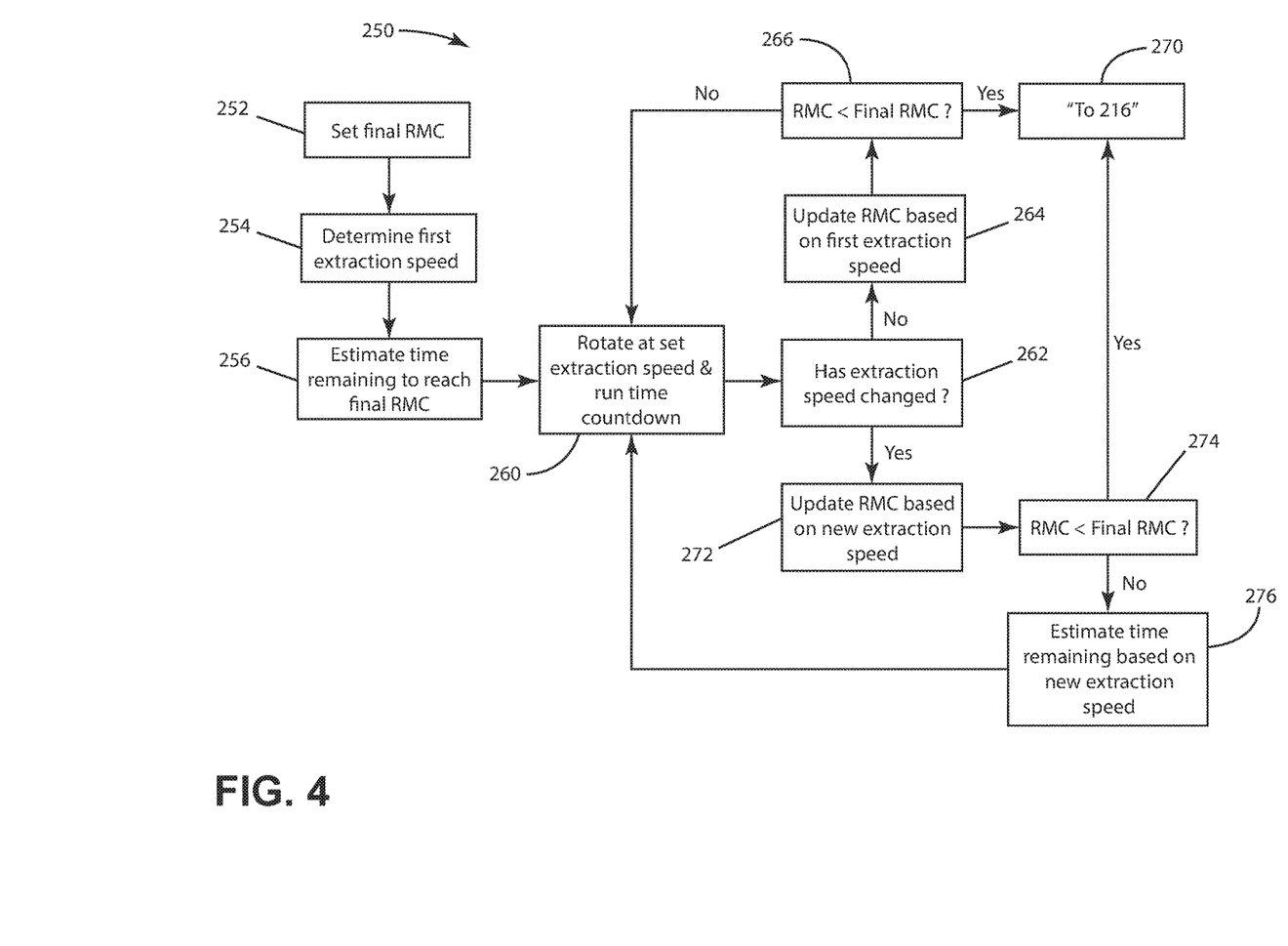
FIG. 4 is a flow chart illustrating a method of operating the laundry treating appliance according to an aspect of the present disclosure.

FIG. 4 illustrates a flow chart of a method 250 for operating a laundry treating appliance, such as the washing machine 10. The sequence depicted for this method is for illustrative purposes only, and is not meant to limit the method in any way as it is understood that the steps may proceed in a different logical order or additional or intervening steps may be included without detracting from the present disclosure. Generally, the method 250 may be used to provide an estimate of the RMC of the laundry during the extraction phase 208 and to update a time remaining in the extraction phase 208 to reach a selected final RMC. While the method 250 is described in the context of use with the method 200 of FIG. 3, the method 250 may be used with other methods that involve treating laundry with liquid and then removing at least a portion of the applied liquid.

The method 250 begins with assuming that the laundry has been treated in the liquid treating phase 207 according to a selected cycle of operation. The controller 96 sets the final RMC at 252 based on input provided by the user through the user interface 98. The final RMC may be based on the cycle of operation selected by the user, a type of laundry being treated, an amount of laundry being treated, a direct input from the user regarding the desired final RMC, or a combination thereof.

At 254, a first extraction speed for rotating the drum 16 to extract liquid from the laundry is determined. The first extraction speed, by way of non-limiting example, may be a maximum allowable speed for rotating the drum 16 based on a predetermined set of conditions, such as the size of the laundry load or an amount of unbalance in the load. In another example, the first extraction speed may be a predetermined percentage of the maximum allowable speed. One example of determining the first extraction speed may be based on the methods disclosed in Applicant's co-pending application entitled "Laundry Treating Appliance and Method of Operation," filed on May 26, 2017, Ser. No. 15/606,210, and published as US20180340283 on Nov. 29, 2018, which is herein incorporated by reference in its entirety.

At 256, the controller 96 estimates a time remaining to reach the final RMC set at 252, which optionally coincides with completion of the extraction phase 208. A first algorithm can be stored in the memory 100 for estimating the time remaining in the extraction phase 208 based on the final RMC set at 252 and the first extraction speed determined at 254. The first algorithm can include one or more functions configured to receive the final RMC set at 252 and the extraction speed determined at 254 as input and provide an output indicative of the time remaining in the extraction phase 208 to reach the final RMC. In one example, the one or more functions used in the first algorithm can be based directly or indirectly on experimentally obtained data that determines RMC for a given load amount and/or load type and extraction speed at various time periods. The experimentally obtained data may be used to determine a standard line or curve that is utilized in generating the one or more functions utilized in the first algorithm.

The drum 16 may be rotated at 260 at the extraction speed determined at 254 and a countdown timer may be initiated to begin a countdown of the time remaining in the extraction phase based on the estimated time determined at 256. Optionally, the time remaining is displayed on the user interface 98. The user interface 98 may display the time remaining in any suitable format and may decrease the time remaining according to any suitable increment, examples of which include minutes and/or seconds. In one example, the time displayed on the user interface 98 may be the time remaining in the extraction phase 208 to reach the final RMC. In another example, controller 96 may be programmed to determine a time remaining in the selected cycle of operation based on the time remaining in the extraction phase 208 to reach the final RMC, as estimated at 256. The time remaining in the selected cycle of operation displayed on the user interface 98 may be based on a predetermined additional time period subsequent to reaching the final RMC to complete the remaining elements of the selected cycle of operation, such as at 216.

The drum 16 may be rotated at the extraction speed at 260 for a predetermined period of time. At 262, the controller 96 can determine if the current speed of the drum 16 is different than the extraction speed implemented at 260. The controller 96 can determined if the current speed of the drum 16 is different than the extraction speed implemented at 260 according to any suitable sampling rate. The sample rate may be based on a predetermine period of time, such as 30 seconds, or may be based on the occurrence of features of the extraction profile. For example, the sample rate may be configured to determine the extraction speed at 262 based on the occurrence of a speed ramp in the extraction profile or following a redistribution phase. If the current speed of the drum 16 is the same as the extraction speed implemented at 260, the RMC may be updated at 264 utilizing a second algorithm stored in the memory 100. The second algorithm can include one or more functions configured to receive the current drum speed and either the time remaining in the extraction phase or an elapsed time in the extraction phase as inputs and provide an output indicative of an RMC of the laundry. In one example, the second algorithm may be based on the same data utilized in the first algorithm. The RMC determined at 264 is an estimate of the RMC and is not necessarily indicative of the actual RMC of the laundry. Optionally, the RMC determined at 264 is displayed on the user interface 98.

At 266, the controller 96 may compare the updated RMC determined at 264 to the final RMC set at 252. If the updated RMC satisfies a predetermined threshold, then at 270 the method proceeds to 216 of the method 200 of FIG. 3 to complete the selected cycle of operation. The term "satisfies" the threshold is used herein to mean that the variation satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted.

For example, if the updated RMC determined at 264 is less than the final RMC, the controller 96 may determine that the final RMC has been reached or surpassed and proceed with completion of the extraction phase 270 and subsequently the selected cycle of operation at 216. If the updated RMC does not satisfy the final RMC threshold at 266, then the method 250 proceeds to continue extracting liquid from the laundry and returns to 260 to continue rotating the drum 16 at the current extraction speed and running the time remaining countdown.

If the extraction speed determined at 262 is different than the speed at which the drum 16 was rotated at 260, then at 272 the RMC may be updated utilizing a third algorithm based on the extraction speed determined at 262. It is contemplated that the extraction speed may change for any number of reasons including, by way of non-limiting examples, based on the extraction profile implemented in the selected cycle of operation and/or may be based on changes in one or more characteristics of the load. One example of a method by which the extraction speed may change during the extraction phase 208 is described below with respect to the method 400 of FIG. 7. Optionally, the updated RMC determined at 272 is displayed on the user interface 98.

The third algorithm may include one or more functions configured to receive the new extraction speed and one of a time remaining in the extraction phase or an elapsed time in the extraction phase as inputs and provide an output indicated of the RMC of the laundry. In one example, the one or more functions used in the third algorithm can be based directly or indirectly on experimentally obtained data that determines RMC for a given load amount and/or load type and extraction speed at various time periods. The experimentally obtained data may be used to determine a standard line or curve that is utilized in generating the one or more functions utilized in the third algorithm. At 274, the RMC determined at 272 is compared with the final RMC set at 252. If the updated RMC satisfies a predetermined threshold, then at 270 the method proceeds at 270 to 216 of the method 200 of FIG. 3 to complete the selected cycle of operation. For example, if the updated RMC determined at 272 less than the final RMC, the controller 96 may determine that the final RMC has been reached or surpassed and proceed with completion of the extraction phase 270 and subsequently the selected cycle of operation at 216.

If the updated RMC does not satisfy the final RMC threshold at 274, then at 276 the time remaining in the extraction phase to reach the final RMC is updated based on the new extraction speed and the updated RMC utilizing the first algorithm. Optionally, the updated time remaining at 272 is displayed on the user interface 98. The method 250 may proceed to 260 to continue rotating the drum 16 and run the time countdown based on the remaining time determined at 276. The processes 260, 262, 264, and 266 and 260, 262, 272, 274, and 276 may be repeated one or more times until the extraction phase 208 is completed. In this manner, the RMC and/or the time remaining in the extraction phase can be continuously evaluated during the extraction phase. The term continuously can include according to a predetermined sampling rate at which the extraction speed is evaluated at 262.

Figure 5:
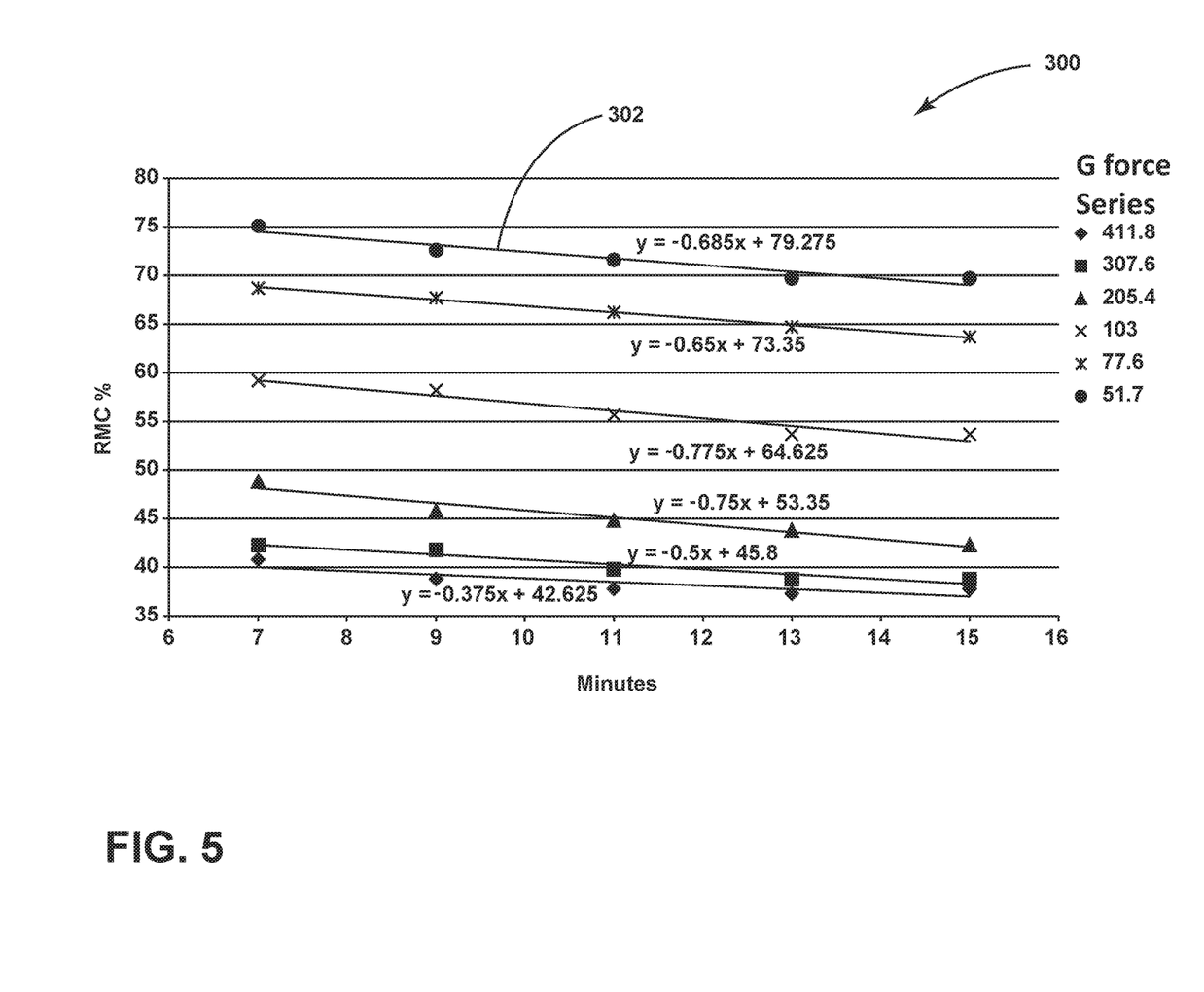
FIG. 5 is a graph representative of a remaining moisture content of the laundry as a function of a G force imparted to the laundry according to an aspect of the present disclosure.

Referring now to FIG. 5, exemplary data 300 that can be utilized in generating the functions used in the first and second algorithms utilized in the method 250 of FIG. 4 is illustrated. The data 300 is not necessarily indicative of real data and is provided for the purposes of illustration only. The data 300 can be utilized to generate functions that relate RMC and extraction phase time at different extraction speeds. The data 300 can be used in the first algorithm at 256 of FIG. 4 to estimate the time to reach the set final RMC based on the first extraction speed determined at 254. The data 300 can also be used in the second algorithm at 264 to update the RMC based on elapsed time.

The data 300 can be determined experimentally for each model of washing 10 or the data from one or more different models may be used to extrapolate data for other models. For example, loads of a known size and type may be evaluated at different extraction speeds using a moisture sensor or alternative method for measuring RMC to determine the time to reach a given RMC at a given extraction speed. Optionally, some of the data points 300 may be estimates based on empirical data. For example, as illustrated in FIG. 5, the RMC may be determined at 7, 9, 11, 13, and 15 minute extraction phase times for a set of extraction speeds corresponding to a range of G forces. The data at each G force may be analyzed using regression analysis to provide one or more functions that model the data 300 to satisfy a predetermined degree of fit. The degree of fit can be determined according to any suitable analysis, a non-limiting example of which includes R-squared analysis.

The one or more functions receive the final RMC as input and output the estimated time for obtaining that RMC at a given extraction speed (which corresponds to a particular G force). The function can then be used to determine the relationship between RMC and time for additional values that were not directly measured. For example, the function generated using regression analysis may be used to estimate the RMC at 6 minutes into the extraction phase at a given G force or vice versa. Optionally, the data 300 may be used to estimate functions corresponding to additional G forces that have not been experimentally measured.

Optionally, the controller memory 100 includes multiple data sets 300 based on one or more characteristics of the laundry load, non-limiting examples of which include fabric type and load amount. For example, data sets 300 corresponding to different fabric types may be stored in the controller memory 100 which are selected for use based on input received from the user. Some materials are more difficult to dry than others in terms of the length of time required during extraction to reach a set RMC and/or based on the maximum extraction speed commonly achievable. For example, a load of all denim generally takes longer than a load of all polyester items to reach a given RMC in an extraction phase.

In one example, the controller memory 100 includes multiple data sets 300 corresponding to a predefined set of fabric types for use by the controller 96 in determining the RMC and/or the remaining time in method 250 of FIG. 4. The controller 96 can be programmed to utilize a particular data set 300 based on input received from the user through user interface 98. Non-limiting examples of fabric types for which a data set relating RMC and time remaining at various extraction speeds include all denim, all polyester, a mixture of denim and polyester, all hard to extract items, all easy to extract items, a mixture of easy and hard to extract items, etc. The fabric type may be determined automatically by the washing machine 10 based on input from one or more sensors or determined based on user input, such as the selected cycle of operation or a selected fabric type.

In one example, the controller memory 100 includes a data set 300 for each selectable fabric type that includes experimentally obtained values. In another example, experimentally obtained values may be shifted "up" or "down" based on the fabric type to provide additional functions for use in the first and second algorithms that are not directly experimentally determined. For example, experimentally obtained data may be used to generate a data set 300 for a fabric type that is designated as being of "medium difficulty to extract from and the data may be utilized to generate a function for use in the method 250 of FIG. 4. The experimentally obtained data may then be shifted up or down to extrapolate functions for use with loads that are easier or harder to extract from than the medium difficulty load.

Still referring to FIG. 5, the data 300 may also be used in the second algorithm to update the RMC as time elapses. At a given G force, the function modeling the relationship between RMC and elapsed time can be used to estimate the time to obtain a set final RMC and vice versa to update the RMC based on the elapsed time. For example, if the extraction speed set at 254 of the method 250 of FIG. 4 corresponds to a G force of 51.7, then the function 302 can be used to both estimate the initial time to reach the set final RMC as well as to update the current RMC as the extraction phase progresses.

Consider an exemplary scenario in which the final RMC set at 252 of the method 250 of FIG. 4 is 70% and the first extraction speed at 254 corresponds to a G force of 51.7. The controller 96 may utilize function 302 in the first algorithm at 256 of the method 250 to estimate the time to reach 70% RMC is about 13 minutes. The controller 96 may be programmed to utilize the estimated time at any desired degree of specificity based on minutes, fractions of minutes, and/or seconds, etc. If the extraction speed does not change, then at 264 of the method 250, the second algorithm may utilize function 302 to update the RMC based on the elapsed time. For example, with reference to function 302 of FIG. 5, at 9 minutes into the extraction phase, the RMC may be estimated as about 73%.

Figure 6:
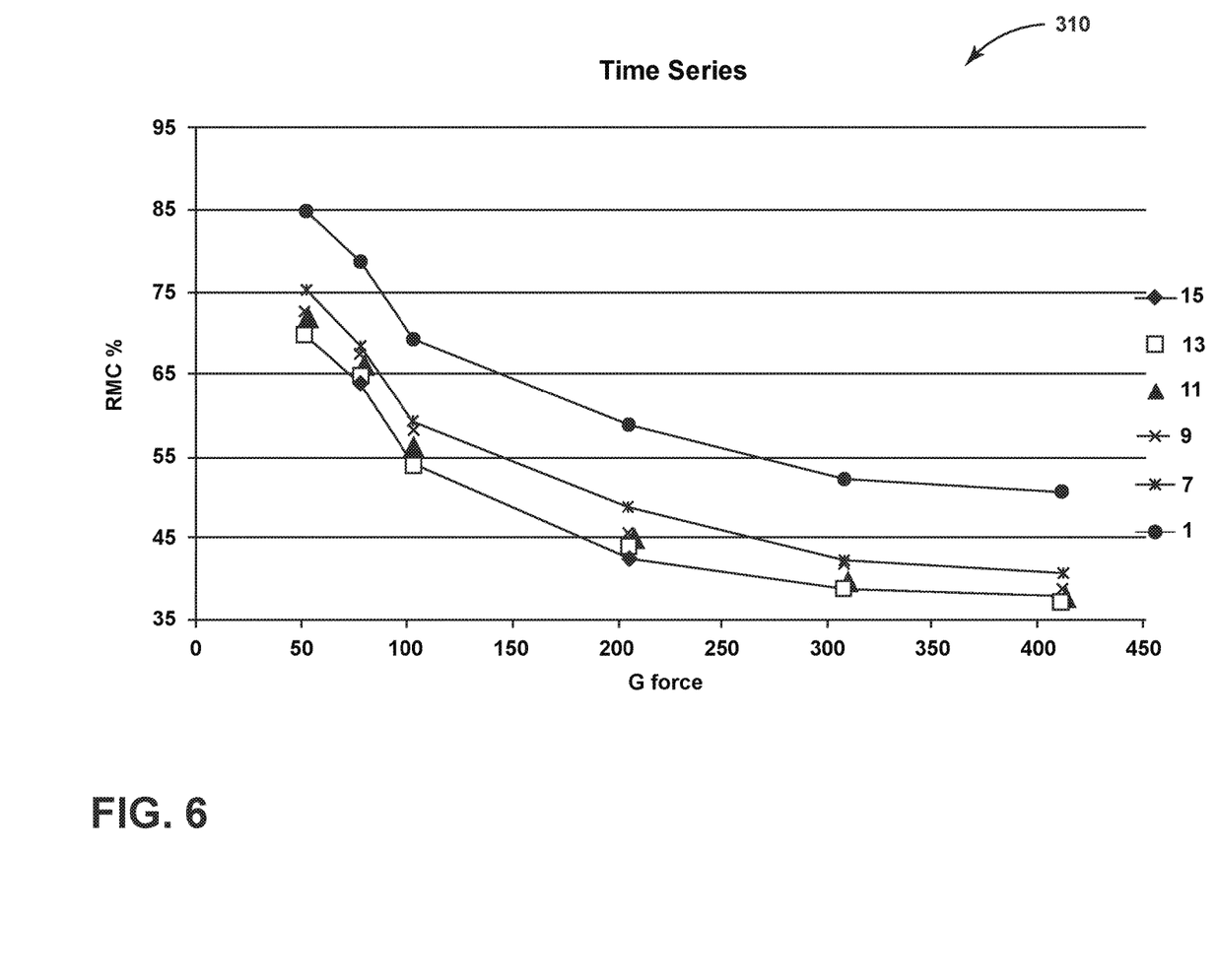
FIG. 6 is a graph representative of a remaining moisture content of the laundry as a function of a time remaining in a phase of a cycle of operation according to an aspect of the present disclosure.

Referring now to FIG. 6, data 310 utilized in generating the functions used in the third algorithm utilized in the method 250 of FIG. 4 is illustrated. The data 310 is not necessarily indicative of real data and is provided for the purposes of illustration only. The data 310 can be utilized to generate functions that relate RMC and extraction speed at different extraction phase times. The data 310 can be used in the third algorithm to estimate the RMC at 272 of the method 250 of FIG. 4 based on a change in the extraction speed.

In one example, the data 310 is obtained in the same manner as described above with respect to the data 300 of FIG. 5 and utilized to generate functions that receive G force and elapsed time as inputs and provide an estimated RMC as an output. As discussed above, generally, as the speed of rotation of the drum 16 increases during the extraction phase, the amount of liquid extracted from the laundry also increases, which can increase the rate at which the RMC decreases. If the extraction speed changes during the extraction phase, the estimate of the RMC according to the second algorithm described above with respect to 264 of FIG. 4 will not be accurate. The data 310 illustrated in FIG. 5 can be used to provide an improved estimate of the RMC as the extraction phase progresses when the extraction speed is not constant. While aspects of the present disclosure are described in the context of the extraction speed increasing during the extraction phase, the methods described herein may be used in a similar manner in scenarios in which the extraction speed decreases.

The data 310 can be used by the controller 96 to estimate an amount of change in RMC following a change in the extraction speed. The amount of change in RMC is subtracted from the previously determined RMC to estimate the updated RMC at 272 of the method 250 of FIG. 4. The data 310 for each time series may be analyzed to provide a function relating an estimate of RMC and extraction speed. In one example, the data 310 can be modeled using a linear function between adjacent data points, as illustrated in FIG. 6. In another example, the data for each time series is modeled using regression analysis to provide one or more functions that model the data 310 to satisfy a predetermined degree of fit. The degree of fit can be determined according to any suitable analysis, a non-limiting example of which includes R-squared analysis.

To update the RMC at 272 of the method of FIG. 4, the first extraction speed determined at 254 of FIG. 4 and the time estimate determined at 256 of FIG. 4 are used by the controller 96 to identify which time series function of FIG. 6 to utilize in the third algorithm at 272. The controller 96 is programmed to estimate the change in percent RMC by identifying the percent RMC at the first extraction speed utilizing the selected time series function and subtracting the RMC corresponding to the new extraction speed based on the selected time series function. The value of the change in percent RMC is then subtracted from the previously determined RMC to provide the updated RMC at 272. The updated RMC is optionally displayed on the user interface 98.

The aspects described above can provide a variety of benefits in implementing a cycle of operation that includes an extraction phase to remove liquid from laundry. The method 250 of FIG. 4 can be utilized to provide a user with an estimate regarding the time remaining to reach the final RMC and/or an estimate of the current RMC. The method 250 can be utilized to improve the estimate regarding the time remaining to reach the final RMC and/or the estimate of the current RMC when the speed at which the drum 16 is rotated during the extraction phase changes.

Figure 7:
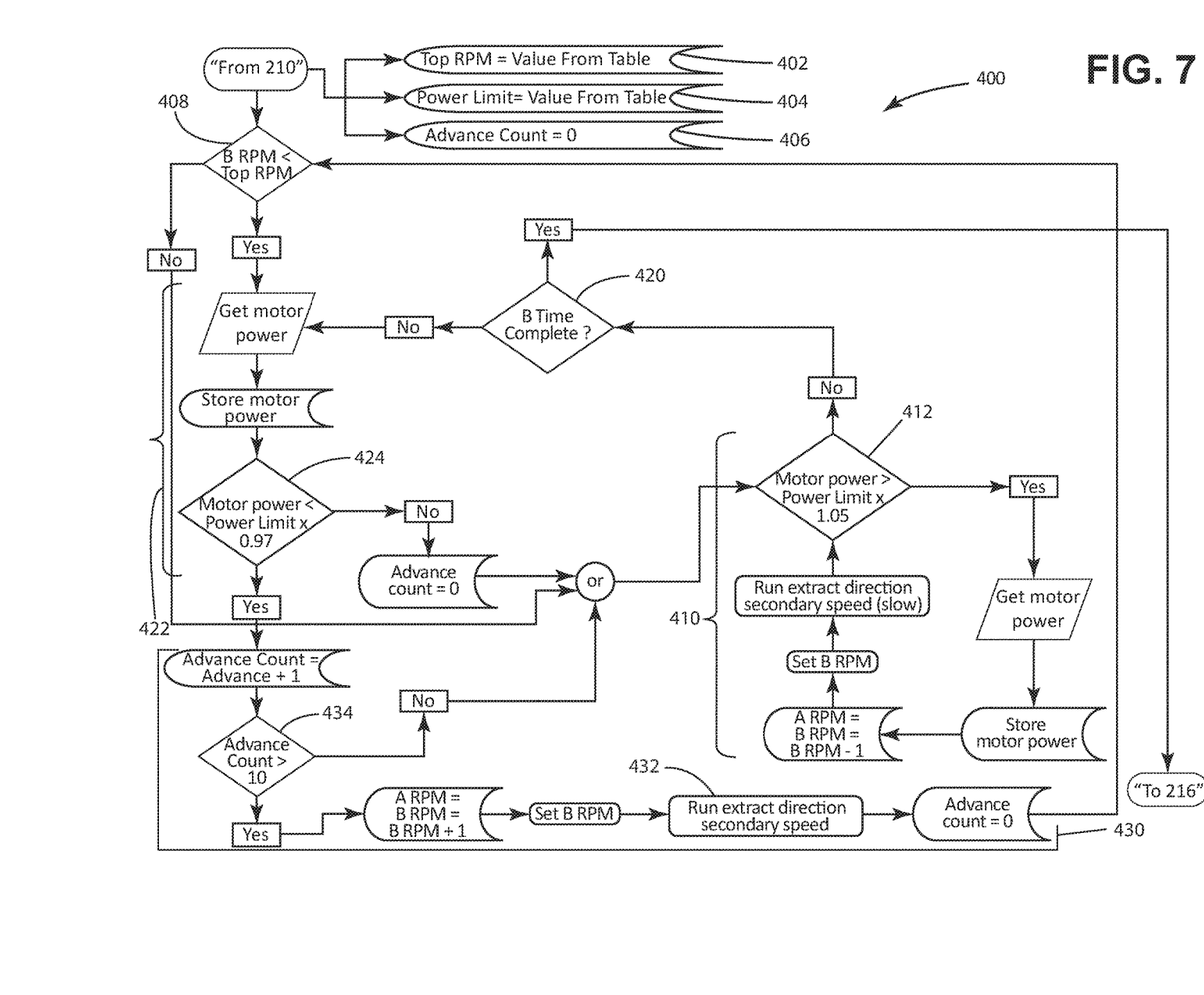
FIG. 7 is a flow chart illustrating a method of operating the laundry treating appliance according to an aspect of the present disclosure.

Referring now to FIG. 7, a method 400 for controlling the speed of rotation of the drum 16 during the extraction phase 208 is illustrated. While the method 400 is described in the context of the method 200 of FIG. 3, it is contemplated that the method 400 can be used with alternative methods that include an extraction phase. The method 400 provides an example by which the extraction speed may be changed during implementation of the extraction phase 208. The method 250 of FIG. 4 can be utilized to provide a user with an estimate regarding the time remaining to reach the final RMC and/or an estimate of the current RMC when the extraction speed changes according to the method 400.

The method 400 can be used to update the extraction speed during the extraction phase 208 while the drum 16 is rotated according to the extraction profile at 210. The method 400 utilizes information stored in the memory 100 of the controller 96 related to a stored maximum rotation speed ("Top RPM") 402 for the washing machine 10, a stored power limit 404 for the motor 88, and a starting Advance Count 406. The Top RPM 402 may be based on one or more factors, non-limiting examples of which include characteristics of the drum 16, tub 14, and suspension system 28, characteristics of the motor 88, and an amount of laundry present in the drum 16.

At 408, the controller 96 determines whether the current extraction speed at 210 of the method of FIG. 3 ("B RPM") is less than the Top RPM. If the current extraction speed B RPM is not less than the Top RPM, then the method proceeds to process 410 in which the motor power is monitored and the extraction speed is controlled to maintain a predetermined safe operating condition. In the example of 410, the safe operating condition is based on operating the motor 88 at a power level that is not greater than a predetermined percentage of the maximum power limit 404 of the motor 88. The predetermined percentage may be 100% of the maximum power limit 404 or some percentage greater than or less than 100%. As illustrated in FIG. 7, the safe operating condition is set to 1.05 times the maximum power limit 404.

At 412, the controller 96 determines whether the current motor power output satisfies a first power threshold, such as 1.05 times the power limit. If the current motor power output satisfies the first power threshold at 412, then the process 410 is implemented to decrease the rotation speed of the drum 16 and thus decrease the power of the motor 88. The process 410 can be repeated multiple times to incrementally decrease the rotation speed of the drum 16 until the current motor power at 412 no longer satisfies the first power threshold.

If the current motor power output does not satisfy the first power threshold at 412, then at 420 it is determined whether the extraction phase is complete. In the example of FIG. 7, completion of the extraction phase is based on a predetermined time period. However, it is contemplated that completion of the extraction phase may be based on any suitable criteria, non-limiting examples of which include an amount of liquid extracted, a remaining moisture content of the laundry, and a rate of liquid extracted from the laundry. If the predetermined time period at 420 is satisfied, then the method 400 proceeds to 216 of the method 200 of FIG. 3 to complete the selected cycle of operation.

If the predetermined time period at 420 is not satisfied, then process 422 is implemented to continue rotating the drum 16 during the extraction phase. The process 422 includes monitoring the motor power at 424 to determine whether the current motor power output satisfies a second power threshold. The second power threshold can be a predetermined percentage of the motor power limit, such as the example of 0.97 times the motor power limit 404 of FIG. 7. The second power threshold at 424 in combination with the first power threshold at 412 defines a motor power range within which it is acceptable for the motor 88 to be operated during rotation of the drum 16 at an extraction speed during the extraction phase.

During the extraction phase in which the drum 16 is being rotated at high speeds and liquid is being extracted from the laundry load, the characteristics of the laundry load can change. For example, as liquid is extracted from the laundry load, a mass of the laundry load may change and/or a distribution of laundry within the drum 16 may change. In another example, an imbalance magnitude or a position of an imbalance may change as liquid is extracted. Cycling between processes 410 and 422 allows the drum to be rotated at a maximum allowable spin speed that may be incrementally increased as long as the motor power remains within an acceptable range, as defined by the first and second power thresholds at 412 and 424.

Process 410 provides a method by which the spin speed can be incrementally decreased if needed to maintain the motor power within the acceptable range defined by the first and second power thresholds 412 and 424. If the motor power never satisfies the first power threshold at 412, the drum 16 will continue to be rotated at the current spin speed according to the cycle of operation. If a characteristic of the laundry load changes such that the motor power does satisfy the first power threshold at 412, the process 410 can be used to rotate the drum 16 at a new spin speed that results in the motor power not satisfying the first power threshold at 412.

Still referring to FIG. 7, an additional process 430 can be included in the method 400 to take advantage of the changing characteristics of the laundry load during the extraction phase to improve liquid extraction from the laundry load by increasing the spin speed to a new, higher spin speed, if conditions allow. As illustrated in FIG. 7, when the current motor power output at 424 satisfies the second power threshold, the method advances to process 430 where the current maximum allowable speed B RPM can be incrementally increased at 432. The process 430 can be coupled with decision making at 408 such that processes 410 and 422 can be implemented to maintain the motor power within the limits defined by the first and second power thresholds at 412 and 424 and process 430 can be implemented to increase the spin speed from the current speed.

Process 430 can optionally be configured to incrementally increase the extraction speed only when the motor power satisfies the second power threshold at 424 a predetermined number of times at 434. For example, as illustrated in FIG. 7, the extraction speed will only be increased if the motor power satisfies the second power threshold at 424 a predetermined number of times, such as 10 times (shown). In the example illustrated in FIG. 7, the number of increases is limited to 10, although the limit may be set to any suitable number. The count decision at 434 may minimize effect of rapid changes in the laundry load as a result of transient laundry load conditions. Process 430 can optionally include a count decision such that the process 430 is limited to be implemented a predetermined number of times. In this manner, the number of times and/or the total amount of increase in the extraction speed during the extraction phase can be limited.

As discussed above, as liquid is removed from the laundry load, one or more characteristics of the laundry may change, resulting in a new laundry load condition that is different from the condition during which the initial spin speed was determined at 210 of the method 200 of FIG. 3. The new condition may provide an opportunity to rotate the drum at a higher extraction speed, which may increase the efficiency of liquid extraction from the laundry load. Rotating at a higher extraction speed can potentially decrease cycle time and/or increase the efficiency of liquid extraction for a given cycle of operation.

For example, rotating at a higher extraction speed can extract more liquid from the laundry within a predetermined period of time, i.e. the rate of extraction may increase. Thus, the amount of liquid extracted within a predetermined period of time may increase, which may result in less energy used in a subsequent drying process. In another example, the rate of extraction can result in the laundry satisfying a given condition, such as a predetermined remaining moisture content, in less time, which may provide time and/or energy benefits. The process 430 provides an opportunity to increase the extraction speed during extraction based on changing conditions of the laundry load, even in situations in which the extraction speed may have been previously decreased according to process 410.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. For example, the features of the methods 200, 250, and/or 400, can be combined to make new methods, not explicitly described, or combined with additional methods without deviated from the scope of the invention.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of operating a laundry treating appliance in accordance with an automatic cycle of operation, the laundry treating appliance having a drum at least partially defining a treating chamber and rotatable about an axis of rotation, a motor configured to rotate the drum, a liquid supply system, and a controller configured to implement the cycle of operation, the method comprising:
   receiving, as user input provided to the controller, a selected final remaining moisture content of a laundry load;
   wetting the laundry load with liquid from the liquid supply system according to at least one of a wash phase or a rinse phase of a selected cycle of operation to define a selected phase, the wetted laundry load having a first remaining moisture content;
   during the selected phase, rotating the drum;
   determining, by an imbalance sensor in communication with the controller, a magnitude of imbalance of the laundry load;
   determining, by the controller, a first extraction speed for rotating the drum during an extraction phase to extract moisture from the laundry load based on the magnitude of imbalance;
   during the extraction phase, determining, by the controller, a time remaining in the extraction phase to decrease the first remaining moisture content of the laundry to the selected final remaining moisture content, wherein the controller is configured to provide the selected final remaining moisture content and a value indicative of the first extraction speed as input into a first function that provides an output indicative of the time remaining in the extraction phase; and
   rotating the drum at the first extraction speed to extract moisture from the laundry load to decrease the remaining moisture content of the laundry load to the selected final remaining moisture content as determined by a moisture sensor.

2. The method of claim 1, further comprising during the extraction phase, determining, by the controller, a second extraction speed, different than the first extraction speed, for rotating the drum based on the magnitude of imbalance.

3. The method of claim 2, further comprising rotating the drum at the second extraction speed, wherein the second extraction speed is greater than the first extraction speed.

4. The method of claim 2, further comprising, subsequent to rotating the drum at the second extraction speed, determining, by the controller, a second remaining moisture content, less than the first remaining moisture content, wherein the controller is configured to provide a value indicative of the second extraction speed as input into a second function that provides an output indicative of the second remaining moisture content.

5. The method of claim 4, further comprising determining, by the controller, a time remaining in the extraction phase to decrease the remaining moisture content of the laundry from the second remaining moisture content to the selected final remaining moisture content, wherein the controller is configured to provide the selected final remaining moisture content and a value indicative of the second extraction speed as input into a second function that provides an output indicative of the time remaining in the extraction phase.

6. The method of claim 5, further comprising displaying the time remaining in the extraction phase on a user interface incorporated into the laundry treating appliance based on the output indicative of the time remaining in the extraction phase.

7. The method of claim 2, further comprising determining, during the rotating of the drum at the first extraction speed, a power output of the motor.

8. The method of claim 7 wherein when the power output of the motor is less than a predetermined power limit of the motor, rotating the drum at the second extraction speed.

9. The method of claim 1, further comprising determining, by the controller, a second remaining moisture content of the laundry, less than the first remaining moisture content, based on the first extraction speed and one of a time remaining in the extraction phase or an elapsed time.

10. The method of claim 1 wherein the first function is based on at least one an amount of laundry in the load or a type of laundry in the load.

11. The method of claim 1, further comprising displaying the time remaining in the extraction phase on a user interface incorporated into the laundry treating appliance.

12. A laundry treating appliance, comprising:
a drum at least partially defining a treating chamber for receiving a laundry load for treatment according to a cycle of operation and rotatable about an axis of rotation;
a liquid supply system fluidly coupled with the treating chamber for supplying liquid to the laundry load to wet the laundry load to a first remaining moisture content according to at least one of a wash phase or a rinse phase of the cycle of operation to define a selected phase;
a motor operably coupled with the drum and configured to rotate the drum according to the selected cycle of operation; and
a controller operably coupled with the motor and configured to control the motor to rotate the drum, the controller being further configured to:
receive, as input from a user, a selected final remaining moisture content of the laundry load;
determine, by an imbalance sensor, a magnitude of imbalance of the laundry load;
determine a first extraction speed for rotating the drum during an extraction phase to extract moisture from the laundry load based on the magnitude of imbalance;
provide the selected final remaining moisture content and a value indicative of the first extraction speed as input into a first function that provides an output indicative of a time remaining in the extraction phase; and
rotate the drum at the first extraction speed to extract moisture from the laundry load to decrease the remaining moisture content of the laundry load to the selected final remaining moisture content as determined by a moisture sensor.

13. The laundry treating appliance of claim 12, further comprising a user interface operably coupled with the controller, the controller configured to control the user interface to display the time remaining in the extraction phase.

14. The laundry treating appliance of claim 12, wherein the controller is configured to, during the extraction phase, determine a second extraction speed, different than the first extraction speed, for rotating the drum based on the magnitude of imbalance.

15. The laundry treating appliance of claim 14, wherein the controller is configured to, subsequent to rotating the drum at the second extraction speed, determine a second remaining moisture content, and where the controller is configured to provide a value indicative of the second extraction speed as input into a second function that provides an output indicative of the second remaining moisture content.

16. The laundry treating appliance of claim 15, wherein the controller is configured to determine a time remaining in the extraction phase to decrease the remaining moisture content of the laundry from the second remaining moisture content to the selected final remaining moisture content, and where the controller is configured to provide the selected final remaining moisture content and a value indicative of the second extraction speed as input into a second function that provides an output indicative of the time remaining in the extraction phase.

17. The laundry treating appliance of d 16, further comprising a user interface operably coupled with the controller, the controller configured to control the user interface to display the time remaining in the extraction phase based on output indicative of the time remaining in the extraction phase.

18. The laundry treating appliance of claim 14 wherein the controller is configured to determine a power output of the motor during the rotating of the drum at the first extraction speed.

19. The laundry treating appliance of claim 18 wherein when the power output of the motor is less than a predetermined power limit of the motor, the controller is configured to rotate the drum at the second extraction speed.

20. A method of operating a laundry treating appliance in accordance with an automatic cycle of operation, the laundry treating appliance having a drum at least partially defining a treating chamber and rotatable about an axis of rotation, a motor configured to rotate the drum, a liquid supply system, and a controller configured to implement the cycle of operation, the method comprising:
receiving as user input to the controller, a selected final remaining moisture content of a laundry load;
wetting the laundry load with liquid from the liquid supply system according to at least one of a wash phase or a rinse phase of a selected cycle of operation to define a selected phase, the wetted laundry load having a first remaining moisture content;
rotating the drum at an extraction speed to extract at least a portion of the liquid wetting the laundry load;
determining, by an imbalance sensor, a magnitude of imbalance of the laundry load and a rotation speed for the drum for extracting moisture from the laundry load based upon the magnitude of imbalance;

determining, by input from a moisture sensor provided to the controller, a remaining moisture content of the laundry;

determining, by the controller, a time remaining in the selected cycle of operation based on the remaining moisture content of the laundry;

rotating the drum at the rotation speed to extract moisture from the laundry until a moisture content of the laundry load reaches the selected final remaining moisture content; and displaying the time remaining on a user interface.

\* \* \* \* \*